United States Patent Office 2,732,826
Patented Jan. 31, 1956

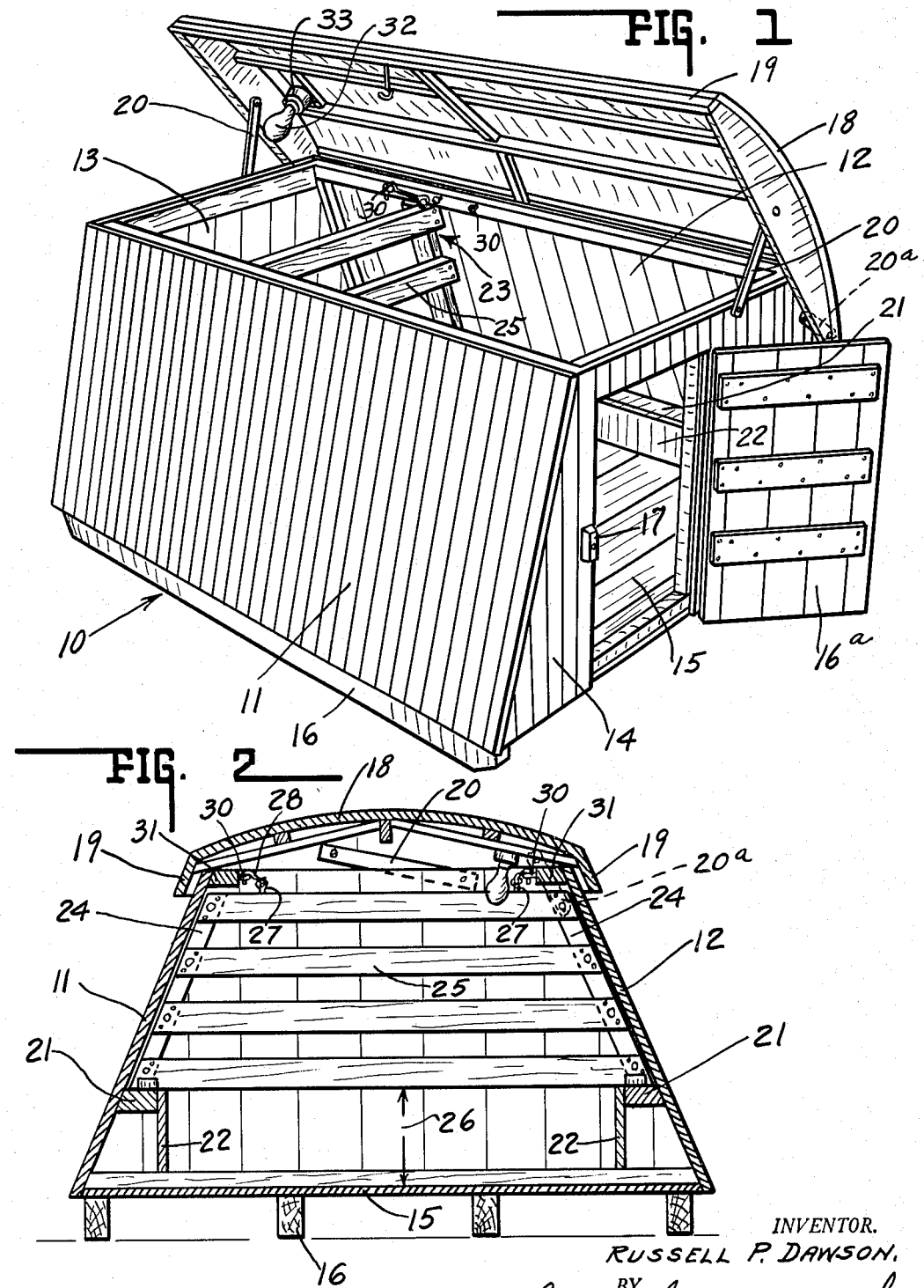

2,732,826

HOG HOUSE STRUCTURE

Russell P. Dawson, Crawfordsville, Ind.

Application September 20, 1954, Serial No. 456,906

1 Claim. (Cl. 119—20)

This invention relates to a hog house structure, and more particularly to one providing space for the sow and safety accommodations for its litter of new born pigs.

As is well known, a very high mortality rate exists among newly born pigs with the chief cause being suffocation or crushing by the mother sow. If the weather is somewhat cold it is only natural that the pigs will remain around the sow even when not feeding, since her warmth is desired. It is because of the sow's movements from one position to another that the pigs are crushed or suffocated in large numbers. It is the primary object of this invention to provide a structure that is adjustably compartmented in such manner as to provide a separate compartment of ready access to the pigs but so constructed as to prevent entrance by the sow.

It is a further object of the present invention to provide means for attracting the pigs into their compartment except at feeding time.

It is a further object of the present invention to provide longitudinally adjustable compartment separating means which are easily adjusted to increase or decrease, as desired, the size of the respective compartments. It is obvious that a smaller amount of space will be needed for the pigs shortly after birth than at later dates when they will be larger. With the present invention the pig compartment may be enlarged to the extent desired and with a minimum amount of effort.

It is a still further object of the present invention to provide means which may be used not only to vary the size of the pig and sow compartments respectively but to convert them into one large pig compartment alone into which the sow is effectively prevented from entering.

It is a still further object of the present invention to provide a structure of the above-mentioned character which has a minimum number of parts, is simple in construction and relatively inexpensive in price.

The full nature of the invention will be understood from the accompanying drawings and the following description and claims.

In the drawings:

Fig. 1 is a perspective view of the invention with the top and door both open.

Fig. 2 is a vertical section view of the invention with the top closed.

In the drawings the invention is shown generally at 10, it being of sufficient size to receive or accommodate both the sow and her litter of pigs. The structure or house includes the inwardly directed side walls 11 and 12, the substantially vertical end walls 13 and 14 and the bottom 15. Connected to the bottom are the longitudinally extending runners or skids 16. End wall 14 has a door 16a formed therein, it being of conventional reinforced construction as shown. The door latch is shown at 17.

The top 18 of the structure is of curved character to shed and drain rainfall therefrom, and includes the eaves 19 which help keep water and the elements from entering the structure. The top is hingedly connected by the hinge bars 20 and 20a to the end walls of the structure as shown particularly in Fig. 1.

Secured to each side wall is a longitudinally extending shelf 21, the two shelves thus provided being coplanar. They may be formed of any satisfactory material but are illustrated as being of wood. Helping support the shelves are the bracing members 22.

Extending from side to side of the structure is a gate shown generally at 23. As will be observed particularly in Fig. 2 the upwardly extending rails 24 of the gate are inwardly directed from bottom to top in a manner complementary to the angle of inclination of the side walls of the structure. Spaced slats 25 are secured at opposite ends to these rails. The gate is seated upon the shelves 21 as shown in Fig. 2, and its lowermost slat is a sufficient distance above the floor 15 of the structure to enable small pigs to pass thereunder. This space is indicated at 26 and obviously is small enough to prevent a sow from going through.

In order to secure the gate in the desired position, hook and eyelet means are employed. An eyelet 27 is shown connected to the top slat of the gate inwardly of each end. A hook 28 is connected to each eyelet. A plurality of other and spaced eyelets 30 are secured to the upper edge of each longitudinally extending runner or beam 31, there being two of such runners secured to the sides of the structure adjacent the top thereof as shown. The gate may be secured at any one of several selected longitudinal positions by latching the two hooks within the desired eyelets 30. As will be observed particularly in Fig. 2 the base of the gate will then be resting upon the shelves with the runners 31 overlying the gate top and spaced slightly thereabove.

In order to attract the small pigs into their safety compartment a light bulb 32 is placed in a socket 33 that is mounted in the top of the structure. Conventional wiring connects the socket to a source of electrical supply (not shown).

In operation, once the sow has given birth to a litter of pigs the gate may be adjusted to provide a smaller, safety compartment for the pigs at one end as shown in Fig. 1. The sow will occupy the larger of the two compartments. By reason of the heat given off by the electric light bulb the little pigs will be attracted, excepting during feeding time, to their safety compartment. They reach it by going under the gate which, as stated, is high enough above the floor to permit them to go thereunder but low enough to prevent the sow's entrance.

As the pigs grow and mature it may be desirable or necessary to increase the size of their compartment. This may be done simply by longitudinally shifting the gate upon the shelves after first unlatching the hooks and then relatching them in other eyelets.

Should it be desired to use all of the structure for little pigs and to prevent the sow from going therewithin, it is necessary only that the gate be moved towards the door end of the structure whereupon the hooks may be inserted in eyelets 30a. When this is done the gate will be immediately adjacent the door opening and while it will permit the small pigs to enter thereunder will nonetheless be effective in preventing the sow from entering.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

A structure for separately housing a sow and her litter of pigs, comprising top, bottom, side and end walls defining a substantially rectangular chamber including a floor, a pair of opposed coplanar support shelves extending longitudinally of said chamber and secured to the side walls of said structure at a predetermined distance above said floor, a partition extending transversely of said chamber and supported upon said shelves, the ends of said partition lying immediately adjacent said side walls, and a plurality of latch and catch means secured to said partition and to said side walls respectively for connecting said partition to said walls at a multiplicity of selective longitudinal positions, the lowermost portion of said element being spaced above the floor a distance sufficient to permit only the pigs to pass thereunder.

References Cited in the file of this patent

UNITED STATES PATENTS

| | | |
|---|---|---|
| 1,230,237 | Sturm | June 19, 1917 |
| 2,255,806 | Overson | Sept. 16, 1941 |
| 2,335,708 | Strobel | Nov. 30, 1943 |
| 2,602,419 | Johnson | July 8, 1952 |
| 2,688,308 | Hines | Sept. 7, 1954 |